Aug. 25, 1936.      R. E. KENNEDY      2,052,307
BEVERAGE CONTAINER AND DISPENSER
Filed Oct. 21, 1932
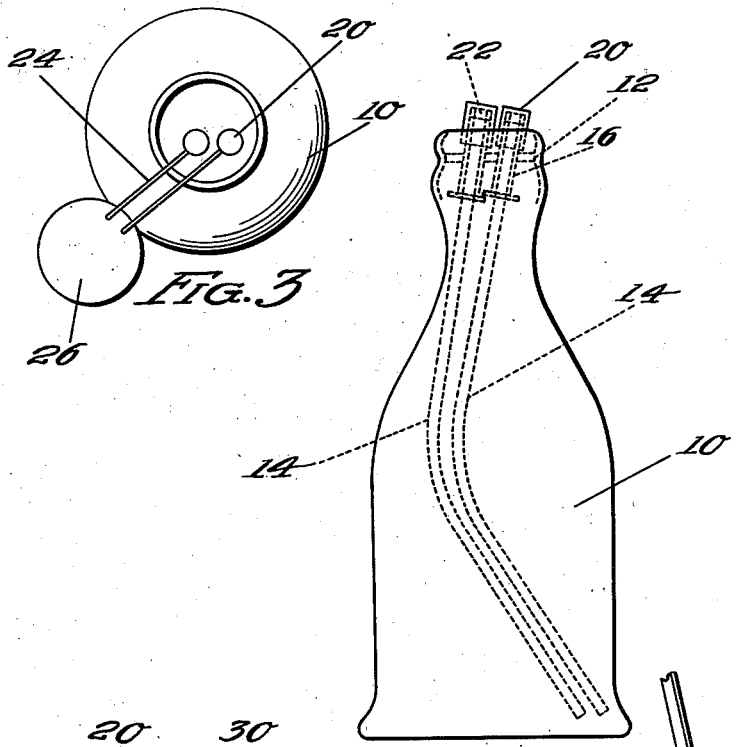
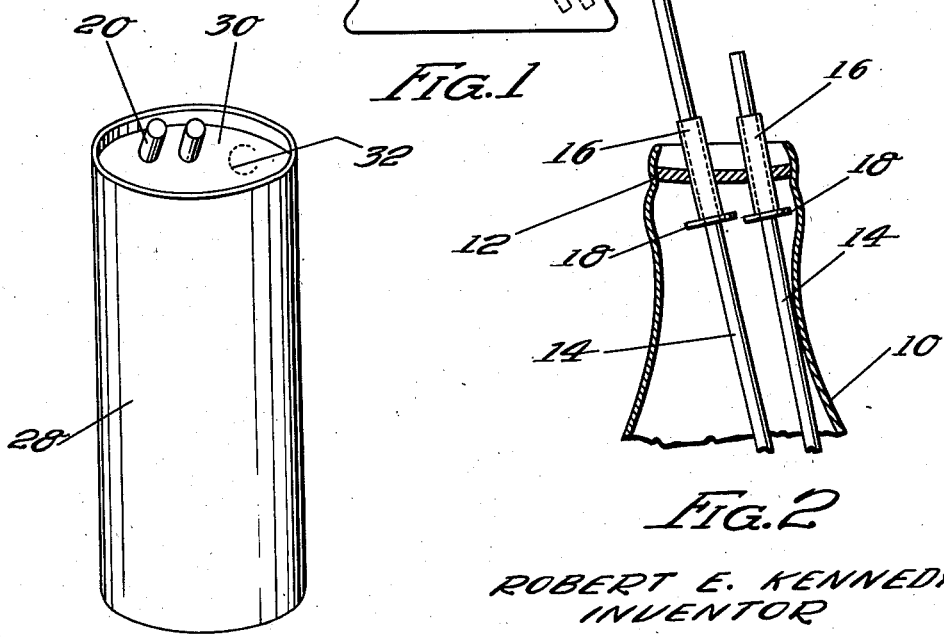
ROBERT E. KENNEDY
INVENTOR
PER Albert J. Fike
ATTORNEY Patented Aug. 25, 1936

2,052,307

UNITED STATES PATENT OFFICE 2,052,307

BEVERAGE CONTAINER AND DISPENSER

Robert E. Kennedy, New York, N. Y.

Application October 21, 1932, Serial No. 638,939

1 Claim. (Cl. 229—7)

This invention relates to an improved beverage container and dispenser, and has for one of its principal objects the provision of a combination container and dispenser for beverages wherein beverages such as soft drinks can be conveniently dispensed in desirable quantities to the purchasing public at any place, and with a minimum expenditure of time, trouble, and cost.

One of the important objects of this invention is to provide a collapsible container for beverages as distinguished from a glass container or bottle, and which is adapted to contain preferably an individual drink which can be served on the spot while cold after which the container and the dispensing means can be discarded without the objections of damage which would ordinarily result from broken glass, bottle caps or the like.

Another important object of the invention is to provide a container for beverages which is preferably composed of waxed paper and which can be cheaply constructed, but which will be capable of containing the beverage in a fluid-tight condition for at least forty-eight hours without leakage or deterioration, and which, after the beverage has been consumed, can be discarded on account of its relatively small cost.

Still another and further important object of the invention is to provide a combination beverage container and dispenser which is made wholly of paper or the like, and wherein there is incorporated with the container a dispensing straw or straws or some other means by which the contents may be conveniently consumed while at the same time the beverage is preserved pure and wholesome, and in desirable condition for consumption.

Other and further important objects of the invention will be apparent from the disclosures in the accompanying drawing and following specification.

The invention, in a preferred form, is shown in the drawing and hereinafter more fully described.

In the drawing:

Figure 1 is a side elevation of an improved container and dispenser constructed in accordance with the principles of this invention, certain details of construction and interior parts being shown in dotted lines.

Figure 2 is an enlarged detail view of the upper end of the combination beverage container and dispenser, showing the improved means whereby the contents are first sealed in the container and later drained therefrom by suction of the consumer.

Figure 3 is a top plan view of the beverage container, illustrating the modified form of a sealing and dispensing means.

Figure 4 is a perspective view of a modified form of container.

As shown in the drawing:

The reference numeral 10 indicates generally the improved container of this invention which is preferably composed of waterproofed or waxed paper or some other suitable material such as, for example, the new transparent cellulose product now on the market and known as "Cellophane" namely regenerated cellulose sheeting. In the event that the container is made of such a transparent material, the contents thereof will be at all times visible.

As shown in Figure 1, the container is preferably constructed in the form of a bottle which may be of any desired shape or size, but one of the main objects of this invention is to provide a container for an individual drink, and therefore, the bottle or container will be of a corresponding size.

A closure member 12 in the form of a cap or the like is provided in the container which cap may also be of waxed paper or similar material, and mounted in suitable openings in this cap is a pair of paper straws or the like 14 which, when in place in the container, are forced downwardly thereinto to such an extent that they are bent slightly out of their original straight shape, thereby acquiring a resilient tendency to expand somewhat upwardly through the cap when the locking pressure thereon is removed. Furthermore, with these purposely curved straws, it will be easy to draw the fluid through the straw and obtain all the liquid, because in tilting the bottle the last of the fluid will naturally settle at the lowest point, and in this manner, the purchaser is not forced to remove or knock off the top of the bottle or container to obtain what might be left therein in the event of the provision of straight straws.

Fitted over the ends of the straws 14 at the points where they pass through the cap 12 is a telescopic paper straw 16 of short length which allows the long straws 14 to pass freely therethrough, allowing the same to be drawn upwardly as indicated in Figure 2 for convenient consumption of the contents of the bottle. The straw elements 16 are preferably provided with flanges 18 at their bottom edges so as to prevent their accidental withdrawal, and furthermore, to provide an additional sealing contact with the underface of the cap 12 in the event that such sealing is necessary.

The outer ends of the straws 14 are sealed with suitable caps or the like 20, and inside these caps may be positioned other sealing elements such as stoppers or small corks 22.

In the modification shown in Figure 3, the caps 20 are omitted, and the corks or plugs 22 are provided with strings or the like 24 attached thereto which strings pass through a tag or label 26 as shown, and it will be obvious that a pull on this tag or label will withdraw the corks, thereby rendering the contents available for immediate consumption.

In Figure 4 is shown a modified form of the container wherein the same is simply cylindrical as at 28, and is provided with a cap or closure element 30, preferably slightly below the upper edge of the cylinder 28, and through which the straws pass and into which the same are fitted, the straws being, as before, closed by suitable closure members or caps 20 which can be readily removed by the customer or if desired, plugs or corks 22 may be employed as shown in Figure 3. Another modification includes a scored or perforated portion of the cap 30 as shown at 32 which portion may be readily punched out with the finger or with some implement as a pencil, thereby allowing free ingress of air to the interior of the container and providing for quicker consumption by the use of both straws if desired. This opening may also be used to empty the contents of the container, if so desired, or may again be used as a means of removing the entire cap 30 whereupon the container itself can be employed as a cap.

It will be evident that herein is provided a means wherein an individual drink can be served cold to the consumer on the spot and wherein such drinks can be distributed through channels not now ordinarily available, as by the use of portable containers holding a dozen or so of these paper bottles which are kept cool with solidified carbon dioxide or the like, and which may be sold by vendors on the street, in ball parks, or in almost any place.

Additionally, the containers after being emptied, can be immediately discarded and will not clutter up the streets or sidewalks in an unsightly manner, and furthermore, will not interfere with traffic as would bottles or bits of broken glass. Additionally, the possibilities of distribution of individual drinks to the customer will be enormously increased.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A combination beverage container and dispenser, including a liquid-tight container, a closure of paper-like material therefor, and dispensing means for the beverage, said dispensing means comprising resilient straws passing through and mounted in the closure, said straws being of a sufficient length to contact the bottom of the container and project beyond the closure, a plurality of tubes fitted in the closure, each tube surrounding a straw in slidable relationship therewith, stops on the tubes on the under-side of the closure for preventing accidental withdrawal of the same, and removable capping means for the straws and tubes.

ROBERT E. KENNEDY.